United States Patent [19]
Veschi et al.

[11] Patent Number: 5,923,655
[45] Date of Patent: Jul. 13, 1999

[54] INTERACTIVE VIDEO COMMUNICATION OVER A PACKET DATA NETWORK

[75] Inventors: Robert Allen Veschi, Germantown, Md.; William Leon Hooton, Herndon, Va.

[73] Assignee: e--Net, Inc., Germantown, Md.

[21] Appl. No.: 08/872,292

[22] Filed: Jun. 10, 1997

[51] Int. Cl.$^6$ .................................................. H04J 3/06
[52] U.S. Cl. ........................... 370/394; 370/509; 370/516
[58] Field of Search ..................... 370/394, 395, 370/487, 505, 509, 510, 516

[56] References Cited

U.S. PATENT DOCUMENTS

| | | | |
|---|---|---|---|
| 5,103,467 | 4/1992 | Bedlek | 375/118 |
| 5,138,440 | 8/1992 | Radice | 358/13 |
| 5,148,429 | 9/1992 | Kudo | 370/9.42 |
| 5,291,483 | 3/1994 | Nagai | 370/60 |
| 5,384,774 | 1/1995 | Martin et al. | 370/516 |
| 5,412,642 | 5/1995 | Nunokawa | 370/17 |
| 5,450,410 | 9/1995 | Hluchyj et al. | 370/394 |
| 5,486,864 | 1/1996 | Zdepski | 348/423 |
| 5,517,250 | 5/1996 | Hoogenboom | 348/467 |
| 5,533,021 | 7/1996 | Branstad | 370/60.1 |
| 5,600,646 | 2/1997 | Polomski | 370/263 |
| 5,640,388 | 6/1997 | Woodhead et al. | 370/516 |
| 5,715,176 | 2/1998 | Mobini | 370/516 |
| 5,790,538 | 8/1998 | Sugar | 370/516 |

FOREIGN PATENT DOCUMENTS 9523495  9/1995  WIPO.

*Primary Examiner*—Min Jung
*Attorney, Agent, or Firm*—Carr & Ferrell LLP

[57] ABSTRACT

A system and method for communicating audio/video data in a packet-based computer network wherein transmission of data packets through the computer network requires variable periods of transmission time. The system comprises: (1) a packet assembly circuit for constructing a data packet from a portion of a stream of digital audio/video data corresponding to an audio/video signal and (2) a packet disassembly circuit, having a buffer associated therewith, for receiving the data packet from the backbone. The packet assembly circuit generates a position identifier indicating a temporal position of the portion relative to the stream, inserts the position identifier into the data packet and queues the data packet for transmission through a backbone of the computer network. The packet disassembly circuit inserts the portion into an absolute location of the buffer, the position identifier determining the location, the portion thereby synchronized with adjacent portions of the stream of digital audio/video data in the buffer to compensate for the variable periods of transmission time.

20 Claims, 5 Drawing Sheets

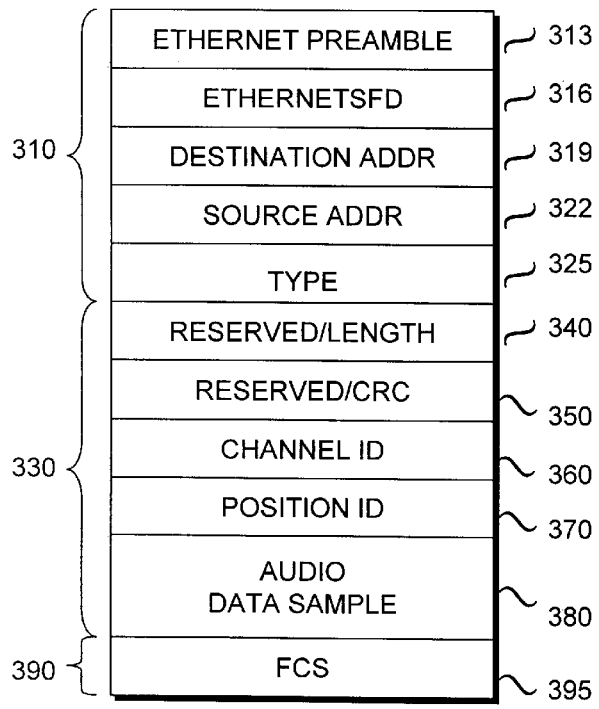
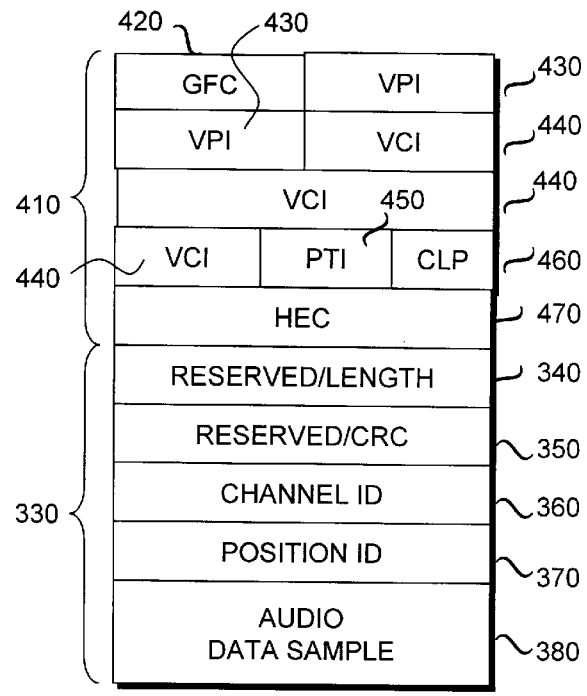

INTERACTIVE VIDEO COMMUNICATION OVER A PACKET DATA NETWORK

TECHNICAL FIELD OF THE INVENTION

The present invention is directed, in general, to computer networks and, more specifically, to a system and method for transmitting and receiving digitized audio/video data in a packet-based computer network to compensate for variable packet transmission times (jitter).

BACKGROUND OF THE INVENTION

Historically, entirely separate communication systems have been employed to transmit audio/video data and computer data (sometimes abbreviated "data" for a like purpose, although it should be understood that computer "data" falls within the broad definition of "data").

Over a century ago, analog telephone networks were developed to carry analog audio signals. Telephone networks allow communication of audio data, or more broadly, audio signals between two or more users by establishing, with central switching equipment, a dedicated communication circuit or "channel" among the users. Because the channel, once established, is dedicated exclusively to transmission of the users' conversation, the conversation is not required to compete for the channel's bandwidth with other conversations. The advantage of having a dedicated channel per conversation is that any transmission delays from speaker to listener is purely a function of the unfettered speed of the audio signal through the telephone network. Since this speed does not significantly vary over time, such dedicated channels are capable of providing "isochronous" transmission. Unfortunately, one significant disadvantage of dedicated channels is that they require significant bandwidth; that is, the complete bandwidth of the channel remains available and dedicated to carriage of the conversation even when no audio/video information is being transmitted.

In recent years, efforts have been underway to establish interface standards for digital transmission of audio signals over telephone networks. The most noted of the existing standards is the Integrated Services Digital Network ("ISDN") significantly sponsored by AT&T. ISDN standardizes connection interfaces, transmission protocols and services to create a unified digital circuit-switching network. More recently, recommendations for Broadband ISDN ("BISDN") have been adopted. Unlike ISDN, which is a digital network standard, BISDN uses packet relay, or Asynchronous Transfer Mode ("ATM") as a transmission standard, and is of particular importance in transmission over broadband "backbones" and, in particular, fiber optic lines. ATM is primarily a connection-oriented technique that can transport both connection and connectionless-oriented services at either a constant bit rate or a variable bit rate. ATM provides bandwidth on demand and handles all traffic types through fast-packet switching techniques that reduce the processing of protocols and uses statistical multiplexing.

In ATM, audio data are split into relatively small blocks or packets, commonly called "cells." The cells are individually communicated through the ATM network by transmitters and receivers that are not synchronized. Networks limited to synchronous transmission generally require dedicated channels and a clock to control the synchronous transmission of audio/video data through the network. Therefore, ATM allows telephone networks to depart from the above-described synchronous transmission of audio/video data over dedicated, isochronous channels, thereby dramatically increasing network efficiency by combining previously dedicated channels and decreasing cost by eliminating synchronicity. Both ISDN and BISDN therefore hold much promise for the future. However, widespread application of these standards has been slow, as the installed base of analog equipment (including telephone sets) is substantial and presents great resistance to change.

Packet transmission or ATM should not be confused with TDM. TDM calls for synchronous division of the overall bandwidth of a common backbone into multiple low speed channels and assigns a specific time slot to each channel. In other words, if there are four channels, each channel is allocated a fourth of the bandwidth. The bandwidth is systematically switched, such that channel 1 gets its fourth-bandwidth, followed by channels 2, 3, 4, 1, 2 and so on. In TDM, the processing power necessary to share common bandwidth is located in various, centralized multiplexers. This centralization is acceptable if channel traffic is constant or predictable. However, when traffic occurs in short intervals (as in the real world), processing becomes nontrivial, resulting in an effective loss of bandwidth.

In contrast, packet transmission or ATM is asynchronous, allocating the total backbone bandwidth on an as-demanded basis. For instance, if channel 1 is highly active, it may receive more than its pro-rata share of overall bandwidth. When channel 1's activity declines, its allocated bandwidth likewise declines. Thus, packet transmission or ATM is most adept at handling "bursty" transmission of data, wherein the activity of each individual channel is subject to relatively wide variation. Thus, because computers transmit data through networks in packets, computer data are said to be "bursty." Unlike TDM, the processing power required to create, transmit and receive packets is distributed among all of the communicating devices, rather than being centralized. Thus, bandwidth is not effectively lost due to inherent limitations in centralized processing.

Although telephone networks have been in place for over a century, computer networks have come into being only in the past quarter century. In contrast with the dedicated channels of traditional telephone networks, computer networks allow individual computers shared access to a common communication backbone having relatively broad bandwidth (in a manner quite similar to ATM).

As in ATM, computer data are divided into packets, each of which includes error protection. The individual networked computers ("nodes") thus are granted access to the complete bandwidth of the backbone so they can transmit their packets of computer data thereon. When the transmitting computer completes transmission of the packet, the backbone is made immediately available for the other computers.

A special case of a computer network is a personal computer ("PC") network. Whereas PCs were once only used as isolated devices, they are now used for a wide range of applications requiring the PCs to communicate with each other over a computer network.

Today, networking in a large office with hundreds of PCs, or in a small office with just a few PCs, is very popular and, quite simply, the best way to share data and communicate among PCs. A local area network ("LAN") is a specific type of network connecting PCs located in relatively close proximity. A wide area network ("WAN") is a network of separate LANs. The backbones of such LANs typically comprise coaxial or twisted-pair cable.

All networks experience delay in end-to-end data transmissions therethrough. This delay (termed "latency") affects the overall efficiency and effective bandwidth of the network. ATM and computer networks, because they are asynchronous, are further subject to "jitter," defined as change in network latency as a function of time. Jitter is largely unpredictable; however, the overall quantity of traffic on a network tends to increase both latency and jitter.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Another conventional physical protocol or topology is Token Ring, developed by IBM. This topology employs a "token" that is passed unidirectionally from node to node around an annular backbone. The node possessing the token is granted exclusive access to the backbone for a single packet transfer. While this topology reduces data collisions, the latency incurred while each node waits for the token translates into a slower data transmission rate than Ethernet when the network is lightly utilized.

Several network and transport protocols designed to handle bursty data transmission is well known in the art. One protocol that enables communication between PCs is the Microcom Networking Protocol ("MNP"), developed by Microcom Systems. MNP is suited for both interactive communication and file transfers and may be implemented on a wide range of computers. MNP packets data with a header and trailer containing packet type, CRC and other information concerning the packet. While the MNP protocol provides relatively error-free transmission of data, the significant overhead of the header and trailer decreases data bandwidth.

The prior art includes many techniques involving manipulation of data to boost the data transmission rate or "throughput" of a network. U.S. Pat. No. 4,691,314, assigned to Microcom, discloses a system for transmitting data in larger, adjustable-sized packets. Because the system allows for larger packets, relatively less header and trailer overhead is required.

However, when the transmission medium is unreliable (such as when the data are transmitted over noisy telephone network lines), errors may occur more frequently in the data. As packet length increases, the chance of corruption of the data within the packet also increases. Furthermore, the larger packets must be retransmitted, thereby decreasing network throughput.

Another network and transport protocol is Transmission Control Protocol/Internet Protocol ("TCP/IP"). This protocol employs a "go back N method" of error and flow control over a datagram network. In a "go back N method" of error control, if there is a transmission error, a packet loss, excessive latency in the delivery of a packet, delivery of a packet out of sequence or an overflow of a receiver buffer, significant loss of throughput is realized due to excessive packet retransmissions.

As the domain of digital computer networks continues to expand, the networks are challenged with new and more difficult responsibilities. One of those challenges is multimedia. In recent years, there have been a number of attempts to produce a digital data network additionally capable of carrying data representing a digitized audio/video signal, thereby additionally functioning as a telephone network and, in sum, yielding a so-called "multimedia network."

As described above, however, audio/video signals are extremely time-sensitive, because users are extremely sensitive to minute tones, inflections and pauses. Thus, a computer data network that also must transmit audio/video data is forced to cope with the communication of both bursty computer and time-sensitive audio/video data on the backbone.

The repercussion is that the above-described data network and transport protocols that are sufficient to transmit data are insufficient for transmission of time-sensitive audio/video data. The latencies present in a communication network, e.g., those relating to coding, packet assembly, media access, propagation, receiver buffering and decoding, must be precisely compensated for to preserve the fidelity of the audio/video signal.

At this point, an interesting observation should be made. Data has been described above as being bursty. It has been implied that audio/video data is somehow not. Both of these assumptions prove to be inaccurate. First, data is only bursty because computer networks have been dealing with it in that manner for so many years. In fact, once transmission of a batch of data begins, data transmission rate is constant. Second, because spoken words are made of small, discrete utterances (syllables or words), audio/video data is inherently bursty. Therefore, while it is certainly true that audio/video data is extremely time-sensitive, audio/video data is likewise bursty. If a way can be found to compensate for network jitter, audio/video data should be highly amenable to packet-based transmission.

Therefore, what is needed in the art is a system and method for transmitting and receiving digitized audio/video data in a packet-based network to adjust for variable packet transmission times. The system and method must deliver end-to-end reliable transmission of data, accounting for all delays in the transmission network while presenting high fidelity audio/video signals at the receiving end.

SUMMARY OF THE INVENTION

To address the above-discussed deficiencies of the prior art, it is a primary object of the present invention to compensate for jitter in a computer network to provide high fidelity transmission of audio/video data through the network.

In the attainment of the above primary object, the present invention provides a system and method for communicating audio/video data in a packet-based computer network wherein transmission of data packets through the computer network requires variable periods of transmission time. The system comprises a packet assembly circuit for constructing a data packet from a portion of a stream of digital audio/video data corresponding to an audio/video signal. The packet assembly circuit generates a position identifier indicating a temporal position of the portion relative to the stream, inserting the position identifier into the data packet and queuing the data packet for transmission through a backbone of the computer network.

The system further comprises a packet disassembly circuit, having a buffer associated therewith, for receiving the data packet from the backbone. The packet disassembly circuit inserts the portion into an absolute location of the buffer, the position identifier determining the location, the portion thereby synchronized with adjacent portions of the stream of digital audio/video data in the buffer to compensate for the variable periods of transmission time.

Transmission of audio/video data over a computer network is a more exacting task than transmission of less time-sensitive computer data. As previously described, audio/video data are extremely time sensitive; and as a result, the system hardware, software and transport protocol must be precisely coordinated to realign the audio/video data at the receiving end. The present invention provides such a system and method for ensuring high fidelity and clear transmission of audio/video data through a computer network.

The position identifier of the present invention should not be confused with a packet sequence number. As will be described in more detail, the position identifier points to a specific, absolute address in the buffer and not to a position of the packet relative to other packets. With sequence numbers, one may only discern that packet 3 follows packet 2 and precedes packet 4. With the position identifier, one may further discern vital packet synchronization information: that packet 3 follows packet 2 by, e.g., 5 milliseconds ("ms") and precedes packet 4 by, e.g., 15 ms. In distinct contrast to sequence numbers, position identifiers may cause portions of packets to occlude (and therefore overwrite) portions of other packets, may result in temporal gaps between packets (resulting in interstitial periods of silence) and allow packets to be transmitted in an arbitrary order without compromising relative packet synchronization.

In a preferred embodiment of the present invention, the system further comprises an interpolation circuit for inserting synthesized audio/video data into a designated location of the buffer to thereby lengthen the portions of the stream of audio/video data in the buffer. The interpolation circuit addresses those circumstances in which the length of the buffer decreases during reception of audio/video data from the backbone. This happens when data are read from the buffer faster than they are written to the buffer.

For example, if the clock of a coder/decoder ("CODEC") that reads from the buffer is too fast, the CODEC reads too rapidly and the buffer becomes too short. The interpolation circuit is adapted to detect when the buffer is too short and adjust the buffer toward a predetermined length by adding the synthesized audio/video data. The interpolation circuit ensures that buffer stays close to its predetermined length for efficient realignment of the audio/video data in the buffer.

The system of the present invention further comprises a decimation circuit for deleting audio/video data from a designated location of the buffer to thereby shorten the portions of the stream of audio/video data in the buffer. The decimation circuit addresses the circumstance in which the length of the buffer increases during reception of audio/video data from the backbone. This happens when data are read from the buffer slower than they are written to the buffer.

For example, if the CODEC clock triggers too slowly, or if the audio/video data are transmitted at an excessive rate through the LAN, the buffer window lengthens. The decimation circuit is adapted to detect when the buffer is too long and adjust the buffer toward its predetermined length by deleting selected audio/video data. Like the interpolation circuit, the decimation circuit ensures that buffer stays close to its predetermined length for efficient realignment of the audio/video data in the buffer.

In a preferred embodiment of the present invention, the data packet of the present invention comprises source and destination fields for determining a transmission route of the data packet through the computer network. This embodiment is primarily directed to an Ethernet environment, wherein each node in the computer network is designated by a specific address. Prior to routing the audio/video data across the backbone of the computer network, the data packet is assigned a source and destination address designating the appropriate nodes. Alternatively, a channel identifier may be used in WAN applications (via ATM) to ensure accurate delivery.

As previously described, packet-based transmission allows advantageous distributed call processing and signaling. Thus, each packet assembly circuit is individually responsible for determining the routing of the audio/video data through the network.

In a preferred embodiment of the present invention, a value of the position identifier is a function of a length of a portion of the stream of digital audio/video data in a previously transmitted data packet. Thus, the position identifier preferably designates the position at which the first datum of each portion is to be placed in the buffer. That position preferably follows the position of the last datum of the previously transmitted data packet.

In a preferred embodiment of the present invention, each portion of audio/video data (a "sample") is placed in a data packet having a prescribed length. In addition to the sample, the data packet contains a position identifier. The position identifier directs the samples into absolute positions in the buffer that may or may not be successive. The distinct advantage of the position identifier is temporal synchronization of samples in the buffer.

It should also be understood that other than audio/video data can occupy the data packet. Given a special header designation, signaling and call processing (control) data can be loaded into a packet. Again, this allows for distributed, decentralized processing. Once loaded into a packet, the control data is treated no differently than audio/video data in its travels through the network.

In a preferred embodiment of the present invention, a length of a travelling window within the buffer of the present invention is about 20 ms. The window is defined as the difference between the locations at which data are written to and read from the buffer. The window is established at that optimal length (in an Ethernet application) as a function of packet length and network characteristics (such as latency in packet assembly, media access, transmission and disassembly). In an ATM network, window length should also be about 20 ms. With the Internet, window length should be about 50–100 ms to account for significant latency in that very large network. In each case, if the window were to be shorter, there may not be sufficient time to allow for the latency. Echo cancellation is typically a requirement when the round trip audio/video delay exceeds 60 ms.

In a preferred embodiment of the present invention, the audio data packet is capable of containing a portion having a length of about 5.5 ms. The audio length of about 5.5 ms corresponds to a 44 byte pulse code modulated ("PCM") audio/video data sample. Again the 5.5 ms length is adjustable and depends upon network characteristics. Also, the length of the portion is compressed. Since many compression algorithms are variable, the uncompressed length may vary.

In a preferred embodiment of the present invention, the system further comprises a digital conversion/compression circuit, coupled to the packet assembly circuit, for digitizing and compressing the audio/video signal into the stream of digital audio/video data. Again, many compression algorithms are variable, so there is not a linear correspondence between uncompressed and compressed data length.

The digital conversion/compression circuit converts the analog audio/video signal into a stream of digital audio/video data for use by the packet assembly circuit. The packet assembly circuit arranges the audio/video data into data packets for transmission across the backbone. The advantage of digitizing and compressing the data is that larger effective bandwidth is thereby available for transporting audio/video data through the computer network.

In a preferred embodiment of the present invention, the system further comprises a decompression/analog conversion circuit, coupled to the packet disassembly circuit, for decompressing and converting the stream of digital audio/video data back into the audio/video signal. Thus, the received audio/video data are converted into a medium that the listener on the receiving end can understand and respond to in kind.

In a preferred embodiment of the present invention, the computer network of the present invention comprises a plurality of computers coupled to the backbone, the packet assembly circuit and the packet disassembly circuit located in separate ones of the computers. Thus, present invention is designed to operate in a computer network having a plurality of nodes and able to support many ongoing telephone conversations. The computer network may be of a client-server or peer-peer topology. Thus, the system of the present invention allows a computer network to supplant a private branch exchange ("PBX") system. PBXs are highly proprietary, expensive and relatively inflexible.

In a preferred embodiment of the present invention, the packet assembly circuit and the packet disassembly circuit are embodied in preprogrammed general-purpose data processing and storage circuitry. Those of skill in the art will recognize that, while the system of the present invention may be embodied in discrete circuitry, microprocessor-based integrated circuits provide an attractive and flexible environment for embodiment of the system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent assemblies do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates an Ethernet data packet of audio/video data assembled according to the present invention;

FIG. 4 illustrates an ATM data cell of audio/video data assembled according to the present invention;

DETAILED DESCRIPTION

Figure 1:
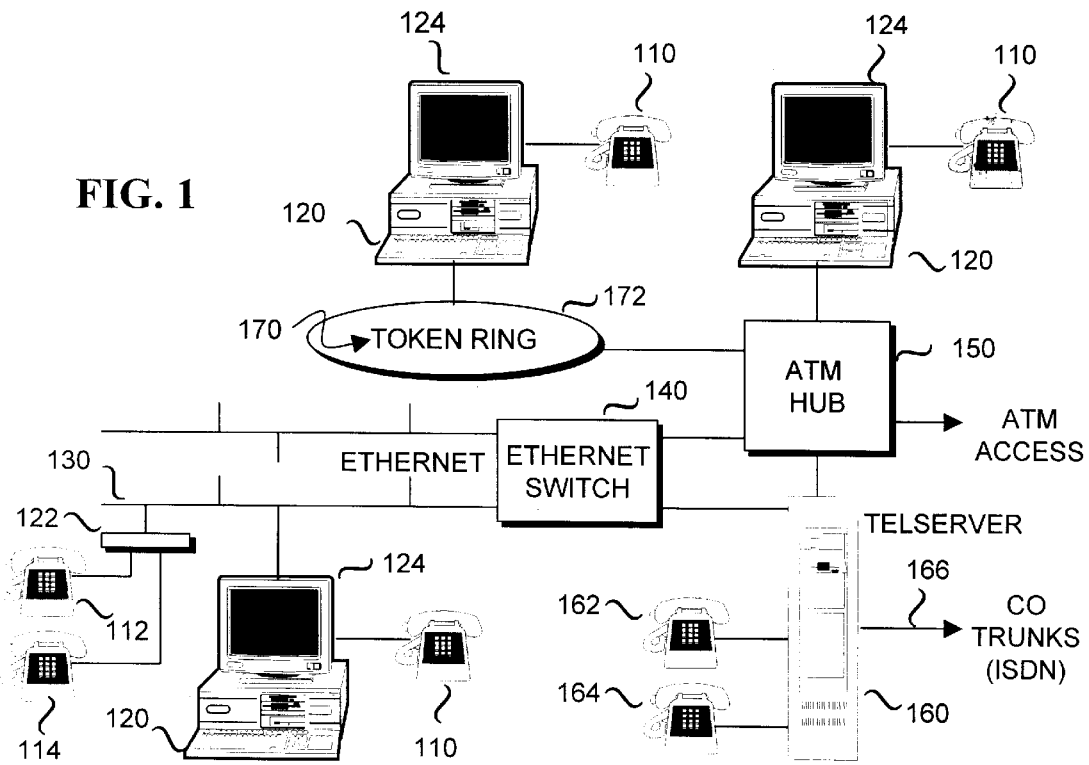
FIG. 1 illustrates a computer network that forms an environment within which the present invention can operate.

Referring initially to FIG. 1, illustrated is a computer network, generally designated 100, that forms an environment within which the present invention can operate. The network 100 is illustrated as including a telephone instrument 110 coupled, via a PC 120 having a display screen 124, to an Ethernet-type computer network backbone 130. Other telephone instruments 112, 114 may be coupled to the backbone 130 via a multiple station card 122. The present invention is capable of transmitting audio signals among the telephone instruments 110, 112, 114 via the Ethernet backbone 130.

The present invention is compatible with various physical layer protocols. The Ethernet backbone 130 is linked through an Ethernet Switch 140 and an ATM hub 150 to a Token Ring backbone 172 of a Token Ring LAN 170. The Token Ring backbone 172 is coupled, via a PC 176 having a display screen 178, to a telephone instrument 174. The ATM hub 150 is coupled, via a PC 154 to a display screen 156, to a telephone instrument 154. Packetized computer data transmitted across the Ethernet backbone 130 is switched through the Ethernet switch 140 to the ATM hub 150. Packetized computer data transmitted across the Token Ring backbone 172 is routed directly through the ATM hub 150. Again, the present invention is fully ATM-compatible, thereby allowing full access to ATM resources via the ATM hub 150.

A telephone server 160 is connected to a plurality of telephone instruments 162, 164 and connected, via the Ethernet Switch 140, to the Ethernet backbone 130. The telephone server 160 is also connected through the ATM hub 150. Audio data from the Ethernet backbone 130 is directed through the telephone server 160, via the Ethernet switch 140, to the ATM hub 150. The telephone server 160 provides full ISDN communication to central office ("CO") trunk lines 166, thereby allowing WAN via ATM.

Again, the present invention provides a system and method for communicating audio/video data in the packet-based computer network 100 wherein transmission of data packets through the computer network 100 requires variable periods of transmission time. The present invention is designed to operate in a distributed architecture network 100 with components as herein described.

The telephone instruments 110, 112, 114, 162, 154, 164, 174 may be traditional analog instruments, but it is within the scope of the present invention that they be ISDN-compatible or other digital instruments. The PCs 120, 154, 174 are illustrated as being conventional PCs having an expansion or input/output ("I/O") bus preferably adhering to the Industry Standard Architecture ("ISA") or Extended Industry-Standard Architecture ("EISA"). Those of skill in the art will understand that the present invention is not limited to a particular hardware architecture. As will be described with reference to FIG. 2, the I/O bus provides an interface by which the system of the present invention allows communication between the backbones 130, 170 and the hub 150 and the corresponding PCs 120, 154, 174.

The PC 120 includes a display screen 124 that is capable of displaying, under software control, data pertaining to operation of the system. This allows a user to use the display screen 124 for visual access to phone features through processing and interface capabilities, such as those provided in Telephony Application Programmers Interface ("TAPI"), developed by Intel and Microsoft or Telephony Services Application Programmers Interface ("TSAPI"), developed by Novell and AT&T. The backbone 130 is a conventional Ethernet backbone comprising multiple parallel conductors that act as paths along which data are transferred among nodes of the computer network 100.

The ATM hub 150 is an interface card that converts Ethernet or Token Ring packet formats to ATM cell formats. The Ethernet packet to ATM cell conversion is discussed in reference to FIG. 4. The ATM hub 150 provides the previously described interface between the Ethernet or Token Ring network and an ATM-switched network.

In the illustrated embodiment, the telephone server 160 multiplexes signals from dedicated telephones 162, 164 and audio/video data from the backbone 130 of the Ethernet physical protocol layer, thereby providing digital service of audio/video data.

Figure 2:
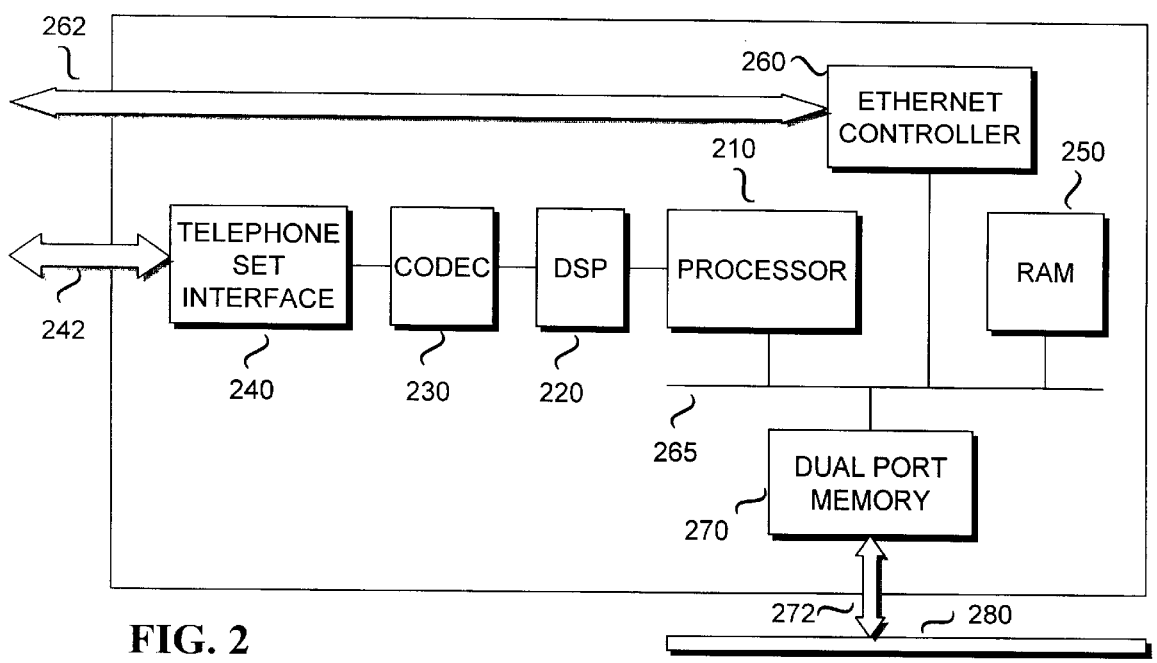
FIG. 2 illustrates a block diagram of a microprocessor-based system constructed in accordance with the present invention.

Turning now to FIG. 2, illustrated is a block diagram of a microprocessor-based system constructed in accordance with the present invention. The microprocessor-based controller comprises a microprocessor 210, a digital signal processor ("DSP") 220, a CODEC 230, a telephone set interface ("TSI") 240, a TSI connector 242, random-access memory ("RAM") 250, an Ethernet controller 260, an Ethernet controller interface connector 262, a dual port memory 270, and a dual port memory interface connector 272.

The illustrated embodiment provides standard telephone instrument 110 connectivity into the PC 120 through the TSI 240 and TSI connector 242. The TSI 240 accepts an analog signal from the telephone instrument 110. The TSI connector 242 is preferably a standard RJ-11 connector.

The illustrated embodiment also provides connectivity to the backbone 130 through the Ethernet controller 260 and Ethernet controller interface connector 262. The Ethernet controller 260 transmits data to, and receives data from, the backbone 130. The Ethernet controller interface connector 262 is preferably a standard RJ-45 connector. The Ethernet controller 260 is internally connected to the processor 210 and RAM 250 by an internal local bus 265.

The TSI 240 is coupled to the CODEC 230. The CODEC 230 provides the analog-to-digital and digital-to-analog conversion for the audio/video data. The CODEC 230 comprises a digital conversion/compression circuit for digitizing and compressing the audio/video signal into the stream of digital audio/video data. Those of ordinary skill in the art should understand that the present invention does not depend upon application of a particular compression/decompression algorithm, or upon whether the data are even compressed at all. The sampling and compression schemes described herein are for illustration only.

When the telephone instrument 110 transmits an analog audio signal to the CODEC 230, the CODEC 230 samples the signal at a predetermined, conventional rate of 8 kHz. The CODEC 230 then preferably employs a known, standard logarithmic compression method (such as A-Law or mu-Law) to compress a 13 or 14 bit wide data sample into an 8 bit compressed sample. The CODEC 230 further comprises a decompression/analog conversion circuit for decompressing and converting the stream of digital audio data back into the audio signal. The decompression circuit restores the 8 bit compressed sample into a decompressed 13 or 14 bit sample and converts the sample into an analog voltage for reproduction in the telephone instrument 110. Finally, the CODEC 230 has an associated clock (not illustrated) that governs the pace of the CODEC's operation.

The DSP 220 analyzes, filters and enhances audio/video data from the CODEC 230. The DSP 220 may also provide echo cancellation or compression/decompression in lieu of the CODEC 230. Echo cancellation is typically a requirement when the round trip audio/video delay exceeds 60 ms.

The processor 210 is charged with the responsibility of compiling the information from the DSP 220 and Ethernet controller 260 and performing the operations required for transmitting the data. The processor 210 therefore embodies the packet assembly circuit and the packet disassembly circuit. As stated above, the packet assembly circuit generates a position identifier 370 that indicates a temporal position of the portion relative to the stream, inserts the position identifier 370 into the data packet and queues the data packet in the Ethernet controller for transmission through the Ethernet backbone 130.

The RAM 250 preferably contains a receiving buffer 510 according to the present invention. It will be recalled that the receiving buffer 510 is associated with the packet disassembly circuit and provides the environment within which portions of audio/video data are reassembled.

The processor 210 further embodies an interpolation circuit for inserting synthesized audio/video data into a designated location of the receiving buffer 510 to thereby lengthen the portions of the stream of audio/video data in the receiving buffer 510 and a decimation circuit for deleting audio/video data from a designated location of the receiving buffer 510 to thereby shorten the portions of the stream of audio/video data in the receiving buffer 510.

Access between the dual port memory 270 and the I/O bus 280 of the PC 120 is provided through the dual port memory connector 272. The dual port memory 270 provides storage capacity and overflow back up in facilitating communication between the internal local bus 265 and the I/O bus 280. Digital data from the Ethernet controller 260 and the processor 210 can be stored in the dual port memory 270.

At this point, it should be stated that the present invention is ultimately directed to application in an ATM environment. It has been stated previously that ATM does not currently enjoy wide acceptance. However, this is changing. Thus, with respect to the embodiments disclosed herein, a two-part description will be undertaken. In FIG. 3, the present invention will be described as applied in the currently popular Ethernet environment. In FIG. 4, the present invention will be described as applied in ATM, its eventual preferred environment.

Turning now to FIG. 3, illustrated is an Ethernet data packet of audio data assembled according to the present invention. The preferred embodiment demonstrates the compatibility of the present invention with an Ethernet II frame having a total length of 74 bytes. A total frame size of 72 bytes is the minimum sized frame allowed by Ethernet. Illustrated are an Ethernet II header 310, a message 330 and an Ethernet II trailer 390.

The Ethernet II header 310 comprises an Ethernet preamble 313, an Ethernet Start Frame Delimiter ("SFD") 316, a destination address 319, a source address 322 and a type field 325. The Ethernet preamble 313 is a 7-byte series that provides timing synchronization for the receivers. The Ethernet SFD 316 is a 1-byte address that separates data at the input of the computer. The type field 325 denotes the upper-layer protocol that is using the data packet.

The Ethernet II header 310 further comprises the destination address 319 and source address 321 for determining a transmission route of the data packet through the computer network. Prior to transmitting the audio data across the backbone 130 of the computer network 100 of FIG. 1, the data packet is assigned the destination address 319 and source address 322. Each individual node in the computer network is designated by a specific address. To ensure that each individual data packet is routed to the proper destination, the Ethernet II header 310 of each data packet is assigned a respective destination address 319 and source address 322. Consequently, the data travels between respective locations.

In particular, the destination address 319 marks the destination field that the data packet will be sent in the computer network. The source address 322 is the address of the station in the computer network that sent the data packet. Both the destination address 319 and the source address 322 are 6 bytes long.

The Ethernet II trailer 390 comprises a Frame Check Sequence ("FCS") field 395. The FCS field 395 is an error-checking device built into each data packet to ensure that only valid frames are processed by the receiving station. The FCS field 395 contains a 4-byte CRC value. A CRC validation is performed by the transmitting stations before sending the data packet. The receiving station performs the same CRC validation, matching the resulting value against the contents of the FCS field. If the numbers match, the data packet is assumed to be valid, if not, the packet is disregarded.

The message 330 of the data packet has a maximum length of 48 bytes. The message 330 is comprised of a reserved/length field 340 (optional, and employed with variable-length audio data packets), a reserved/CRC field 350, a channel identifier 360, a position identifier 370, and a audio data sample 380.

The reserved/length field 340 is 1 byte long and specifies the number of bytes contained between the reserved/length field 340 and the last byte in the audio data sample 380. The reserved/CRC field 350 is a 1-byte field reserved for error checking purposes in an ATM cell. The channel identifier 360 is a 1 byte field that identifies the message 330 as a packet of control data (perhaps containing signaling commands) if the channel identifier 360 is equal to 255 otherwise it represents the audio data of a specific station. The channel identifier allows multiple voice connections on a single real channel to save switching complexity within the data network. It also allows voice conferencing on shared media without additional dedicated bandwidth. The channel identifier is also used in a call setup sequence to allow multiple conversations between two voice server devices, thereby suitable for ATM transport.

The position identifier 370 is a pointer representing the newest audio sample 380. The position identifier 370 is a 1-byte long pointer to 4-byte words of the audio sample 380 and can represent 256×4 bytes (1 kilobyte) before it overflows and wraps. Since digitized audio/video typically uses a standard 8 kHz sampling rate (125 microseconds between samples), 256×4×125 microseconds is the total time that the position identifier 370 can represent before wrapping. The position identifier 370 is used both when the channel identifier 360 represents audio data and when the channel identifier 360 represents control data (such as signaling or call processing). For example, when the channel identifier 360 equals 255 then the position identifier 370 is used to represent a signaling data message type.

Finally, the message 330 of the data packet contains up to 44 bytes of digitized audio data samples 380. The audio/video data samples 380 contain digitized audio data if the channel identifier 360 is a value other than "255." The audio data sample 380 contains system commands if the channel identifier equals "255." The commands may be, for example, information blocks used to set up, take down, forward and conference telephone calls.

The present invention is designed to handle data packets of variable-size, to manage variable time transmission of data and to increase the throughput efficiency of data across the backbone 130 of the computer network. This attribute is extremely important to transmitting time-sensitive audio/video data to achieve high audio/video fidelity.

Turning now to FIG. 4, illustrated is an ATM data cell of audio data assembled according to the present invention. The preferred embodiment demonstrates the compatibility of the present invention with an ATM cell having a total, fixed length of 53 bytes. The cell is characterized by an ATM header 410 preceding a message (the message 330 of FIG. 3).

ATM combines the benefits of both circuit switching and cell switching by providing multiple switched virtual circuit connections to users through a single access to a network. The ATM header 410 contains information specifying the virtual path (a Virtual Path Identifier ("VPI") 430) and virtual channel (Virtual Channel Identifier ("VCI") 440) of the cell. The VPI 430 and VCI 440 together establish a node-to-node communications channel. Switch routing is based on the VPI 430 and VCI 440. The ATM switch requires a connection to be established between the incoming and outgoing virtual channels before information can be routed through the switch. The ATM switch then switches and routes each individual cell from the incoming multiplexed cell stream to the outgoing multiplexed cell stream based upon the virtual channels identified within the ATM header 410. In this context, ATM is truly seen as a connection-oriented technology. The ATM switch maintains cell sequence; and each cell is switched at the cell rate, not the channel rate, to accommodate for variable bit rate transmissions.

A Cell Loss Priority Field ("CLP") 460 within the ATM header 410 establishes priority on the network. There are two levels of semantic priority that allows users or network providers to choose which cells to discard during periods of network congestion. The types are defined by a "1" or "0" in the CLP 460 within the ATM header 410. During periods of congestion, the CLP 460 determines which information will be discarded or switched through the network.

The Payload Type Indicator ("PTI") 450 in the ATM header 410 discriminates between a cell carrying user information (such as audio/video data) or service information (such as control data) in the message field 330. The Header Error Control field ("HEC") 470 provides error checking of the ATM header 410.

The Generic Flow Control field ("GFC") 420 of the ATM header 410 is designed to provide shared public access similar to the functionality of a Metropolitan Area Network ("MAN"). GFC 420 is used when there is a single user access point servicing multiple terminal interfaces, such as those found in a LAN environment. Each terminal must receive equal access to the network facilities, and the GFC 420 ensures that each terminal will get equal access to the shared network bandwidth. The GFC 420 will manage the various LAN topologies and architectures.

The six fields are positioned within the 5-byte ATM header 410 at address locations as displayed in the illustrated embodiment. Distinct from an Ethernet data packet, the ATM cell transmits information through the network intact with no error checking or correction performed on the message field 330. The reserved/CRC field 350 is reserved to perform error checking on the channel identifier 360, the position identifier 370 and the audio/video data sample 380 in an ATM cell at the receiving end. The message field 330 and contents therein are as described in relation to the corresponding portions of the Ethernet data packet previously described in conjunction with FIG. 3. Translation between an Ethernet data packet and an ATM cell is completed by stripping the destination address 319 and source address 321 from the message field 330 and converting the source and destination addresses 319, 321 to the VPI 430, VCI 440 and channel identifier 360 associated with the ATM cell.

Figure 5:
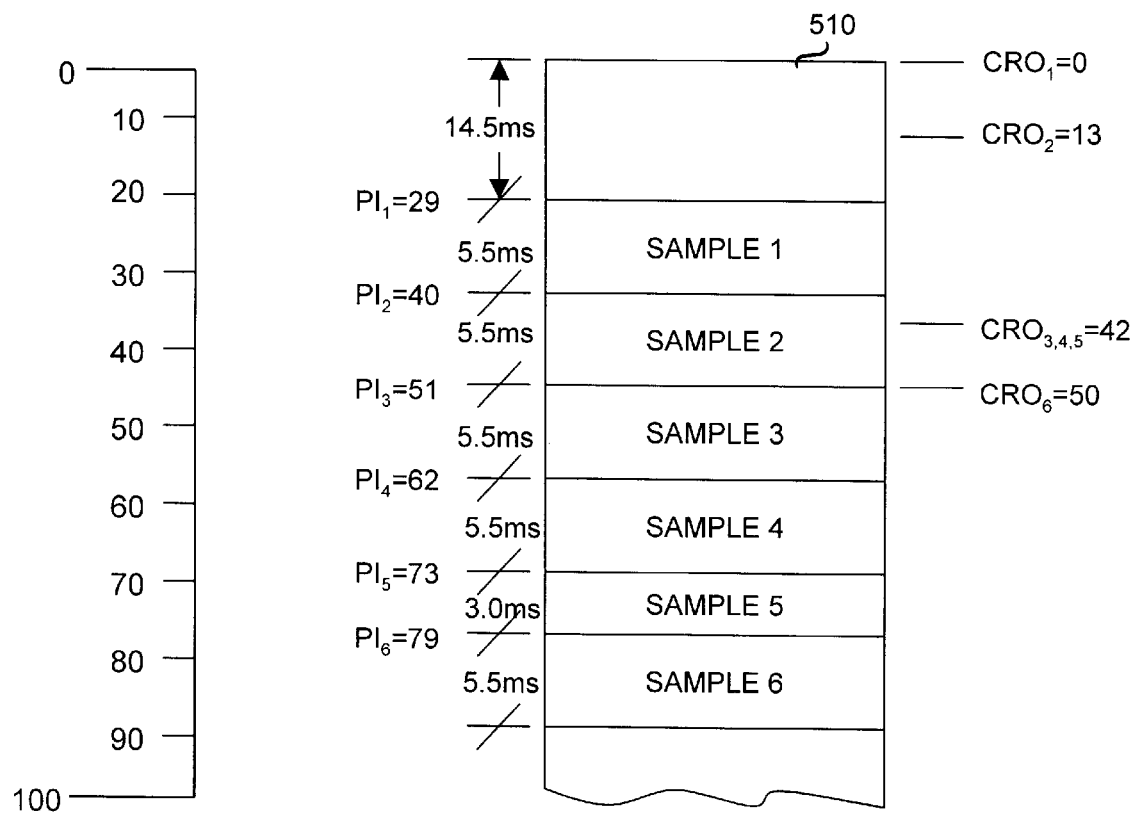
FIG. 5 illustrates the operation of the buffer of the present invention.

Turning now to FIG. 5, illustrated is the operation of the receiving buffer 510 of the present invention. As previously discussed, the system is comprised of a packet disassembly circuit, having the receiving buffer 510 located in the RAM 250 associated therewith, for receiving the audio/video data sample 380 from the backbone 130. The packet disassembly circuit inserts the portion into an absolute location of the receiving buffer 510, the position identifier 370 determining the location. The audio/video data sample 380 is thereby synchronized with adjacent audio/video data samples 380 in the receiving buffer 510 to compensate for the variable periods of transmission time. The CODEC reads from the receiving buffer, lagging the audio/video data samples, as they are inserted, by some period of time (20 ms in the illustrated embodiment), thereby creating a travelling window in the receiving buffer 510 of 20 ms delay. Since the receiving buffer is of a physical finite length (about 1 kilobyte in the preferred embodiment), the window "wraps around" the addresses of the receiving buffer 510. Thus, at any given addressable location within the receiving buffer 510 data are first written to the location, then read from, then written to again, and so on. The receiving buffer 510 therefore acts as a fixed-delay playback buffer.

Again, in the illustrated embodiment, the length of the window in the receiving buffer 510 is about 20 ms. The window is software settable at that value to account for jitter in the transmission network, and packetization and depacketization delay. The jitter in the network is primarily due to data traffic congestion. The pre-set length of the window more than adequately accommodates a data packet and any inherent system delays in reconstructing the audio/video data at the receiving end.

As previously mentioned, the CODEC 230 reads from the receiving buffer 510 at a rate ideally equal to that at which audio/video data are added, thereby maintaining window length. As data are read, the data are replaced with white noise data, representing silence. If the white noise data are not subsequently overwritten with received audio/video data in a subsequent pass through the receiving buffer 510, the CODEC 230 reads and decompresses the white noise data instead, producing a synthesized near-silence for the benefit of the listener in lieu of audio data.

FIG. 5 specifically illustrates 6 audio/video data samples 380 of various sizes and variable transmission delays being placed into the receiving buffer 510 as a function of the position identifier 370 contained in each data packet. A value of the position identifier 370 may be a function of a length of audio/video data sample 380 in a previously transmitted data packet but is not constrained thereby. The position identifier 370 directs each audio/video data sample 380 into specified absolute positions of the receiving buffer 510 at the receiving end. Thus, the position identifier 370 is fundamentally different from a packet sequence number.

FIG. 5, in conjunction with the following Table I, illustrates insertion of audio/video data samples into the receiving buffer 510 according to the present invention.

TABLE I

| Audio Data Sample Number | Audio Data Sample Size (bytes) | Delay of each packet (ms) | Position Identifier | Buffer CODEC Read Offset | Length (ms) |
| --- | --- | --- | --- | --- | --- |
| 1 | 44 | 0 | 29 | 0 | 20 |
| 2 | 44 | 1 | 40 | 13 | 19 |
| 3 | 44 | 10 | 51 | 42 | 10 |
| 4 | 44 | 4.5 | 62 | 42 | 15.5 |
| 5 | 24 | 1.5 | 73 | 42 | 18.5 |
| 6 | 44 | 0 | 79 | 50 | 20 |
| 7 | 44 | 0 | 90 | 60 | 20.5 |

Again, at a sample rate of 8 kHz, individual bytes or samples occur in 0.125 ms intervals. "Position identifier" ("PI") locates each temporally successive audio data sample 380 in an absolute position within the receiving buffer 510. The PI is divided by 4, such that a PI of 6 actually points to byte 24 in the receiving buffer 510.

The "CODEC Read Offset" ("CRO") reflects the read position with respect to the CODEC in the receiving buffer 510. Analogous to the PI, the CRO is the actual CODEC read position divided by 4, such that a CRO of 1 actually points to byte 4 in the receiving buffer 510. In the illustrated embodiment, sample 1 contains 44 bytes of data without a delay in the system. Thus, CRO1 is 0 and PI1 is 29, resulting in a 20 ms buffer length (14.5 ms plus 5.5 ms of sample 1). The 44 bytes of audio data sample 380 are placed in the last 5.5 ms of the receiving buffer 510.

In sample 2, the system experiences a 1 ms delay. The 44 bytes of audio data sample 380 are placed adjacent to sample 1 with PI2 equal to 40. Since the audio data sample 380 is delayed 1 ms, CRO2 equals 13, equating to a total of 6.5 ms. Thus, the difference between PI2 and CRO2 contracts to a 27 position difference. Adding the 27-position difference between PI2 and CRO2 to the 44 bytes of audio data sample 380 equates to a 19 ms window for sample 2. A 10 ms system delay is encountered by sample 3, leading to a contraction of the window to 10 ms. In samples 4 and 5, the system has compensated for some of the delay and, as a result, the length of the windows has increased as shown. As previously discussed, the position identifier 370 represents an absolute position in the receiving buffer 510 regardless of the delay in the system. Furthermore, once the transport media is free after the extended delay associated with sample 3, samples 3–5 are immediately positioned in the receiving buffer 510 one after the other as shown.

Sample 5 further illustrates the circumstance when a shortened audio data sample 380 is transmitted. Sample 5, which is only 24 bytes long, is inserted into the receiving buffer at PI5=73. Since sample 5 is short by 20 bytes, the missing 20 bytes are filled with white noise, representing silence. The silence is not shown, as will be explained.

Next sample 6 arrives. Sample 6 is a full-length packet of 44 bytes. Thus, PI6 equals 79. Sample 6 overwrites the 20 bytes of silence that had been appended to the end of sample 5. Since FIG. 5 already shows sample 6 in place, the silence is already overwritten and thus not shown.

Finally, sample 7 displays the circumstance when the CODEC clock operates too slowly. For purposes of discussion, the CODEC clock is assumed to be grossly out of frequency, such that the effect produced thereby is emphasized. In such case, PI advances 5.5 ms or 11 positions from the previous PI to position 90 in the receiving buffer 510. However, the slow CODEC clock forces the CRO to lag. In this instance, the CRO only advances 5.0 ms or 10 positions from the previous CRO to position 60 in the receiving buffer 510. The result is that the length of the window is 20.5 ms.

Decimation is therefore required to shorten the receiving buffer 510 to the pre-set size. Decimation is performed in adjustment intervals as follows: 1 byte for every 2 bytes away from the ideal window length (160 bytes, in the illustrated embodiment), 2 bytes for every 3 or 4 bytes away from the ideal window length and 3 bytes for every 5 or 6 bytes away from the ideal window length. In this instance, the buffer is 0.5 ms too long, equating to 4 bytes. Accordingly, the decimation circuit must remove 2 bytes from the receiving buffer 510 to adjust the receiving buffer 510 window toward the ideal length. Interpolation and decimation are ongoing processes in the system of the present invention.

Before leaving FIG. 5, it should be noted that, if window length is reduced to zero (either by virtue of the non-transmission of periods of silence or by virtue of reception of multiple invalid packets), the CODEC 230 simply reads the white noise in the receiving buffer 510, thereby simulating silence, again for the benefit of the listener.

Figure 6:
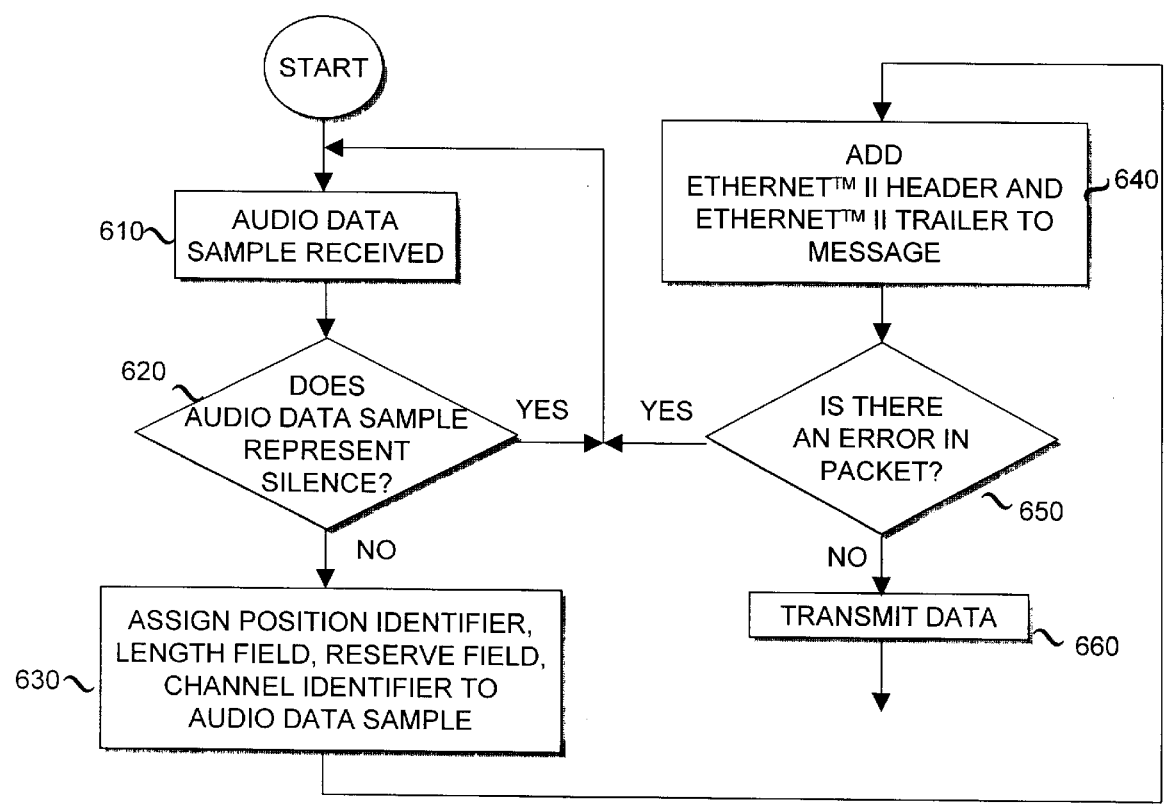
FIG. 6 illustrates a flow diagram of the method of assembling a data packet according to the present invention.

Turning now to FIG. 6, illustrated is a flow diagram of the method of assembling a data packet according to the present invention. The packet assembly circuit constructs a data packet from a portion of a stream of digital audio/video data corresponding to an audio/video signal. As illustrated in the preferred embodiment, in a step 610, a sample of audio/video data is received into the packet assembly circuit. In a decisional step 620, the packet assembly circuit determines whether the sample represents silence or sound by comparing the data therein to a predetermined threshold. If the data have a value less than the threshold, a packet is not generated, as it is of little value to occupy network bandwidth transmitting silence. If the data have a value equaling or exceeding the threshold, execution proceeds to a step 630, wherein the packet assembly circuit assigns the reserved/length field 340, the reserved/CRC field 350, the channel identifier 360 and the position identifier 370 to the audio/video data sample 380. The previously described fields appended to the audio/video data sample 380 constitute the message 330.

In a step 640 (only applicable in an Ethernet environment), the Ethernet II header 310 and Ethernet II trailer 390 are affixed to the message 310. The Ethernet II header 310 and Ethernet II trailer 390 contain information necessary to route the data packet through the computer network and to check the transmitted data for errors. In an ATM environment, an ATM header is affixed to the packet.

In a step 650 (again, only applicable in an Ethernet environment), the data packet is evaluated for errors. If there is an error in the data packet, the process restarts, otherwise the process moves to a step 660. In the step 660, the data packet is queued for transmission across the backbone of the network.

Figure 7:
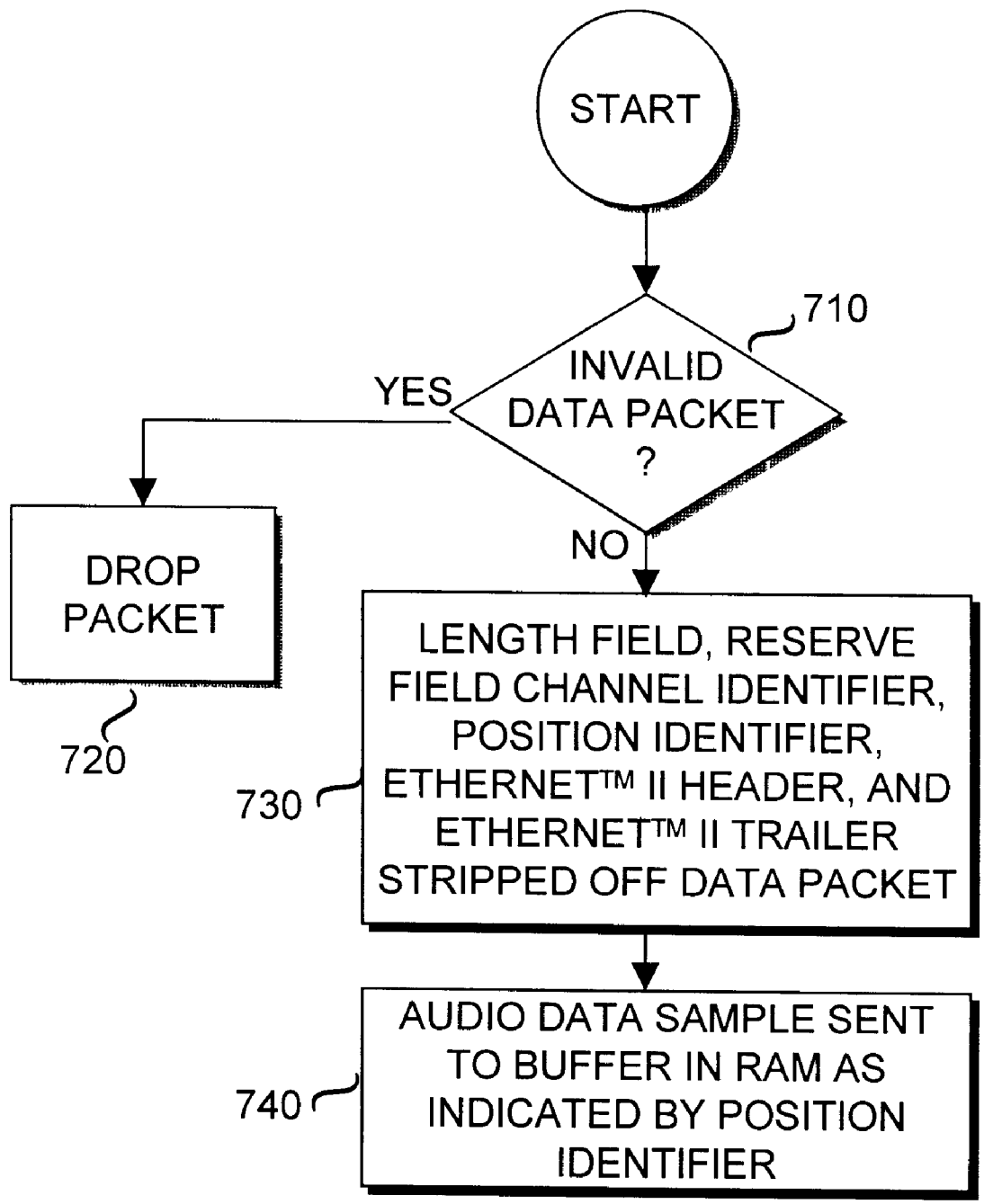
FIG. 7 illustrates a flow diagram of the method of disassembling a data packet according to the present invention.

Turning now to FIG. 7, illustrated is a flow diagram of the method of disassembling a data packet according to the present invention. In a step 710, if the receiver accepts an invalid packet, the packet is disregarded and the disassembling process for that packet terminates in a step 720. In a step 730, assuming the packet is valid, the packet disassembly circuit strips the reserved/length field 340, the reserved/CRC field 350, the channel identifier 360 and the position identifier 370 from the audio/video data sample 380. In an Ethernet environment, the packet disassembly circuit also strips the Ethernet II header 310 and Ethernet II trailer 390.

In a step 740, the packet disassembly circuit inserts the audio/video data sample 380 into an absolute location of the receiving buffer 510 (of FIG. 5) according to the value of the position identifier 370. The audio/video data sample 380 is thereby synchronized with adjacent audio/video data samples 380 of the stream of digital audio/video data in the receiving buffer 510 to compensate for the variable periods of transmission time.

From the above, it is apparent that the present invention provides a system and method for communicating audio/video data in a packet-based computer network wherein transmission of data packets through the computer network requires variable periods of transmission time. The system includes a packet assembly circuit for constructing a data packet from a portion of a stream of digital audio/video data corresponding to an audio/video signal and a packet disassembly circuit, having a buffer associated therewith, for receiving the data packet from the backbone. The packet assembly circuit generates a position identifier indicating a temporal position of the portion relative to the stream, inserts the position identifier into the data packet and queues the data packet for transmission through a backbone of the computer network. And the packet disassembly circuit inserts the portion into an absolute location of the buffer, the position identifier determines the location, the portion thereby synchronized with adjacent portions of the stream of digital audio/video data in the buffer to compensate for the variable periods of transmission time.

Although the present invention and its advantages have been described in detail, those skilled in the art should understand that they can make various changes, substitutions and alterations herein without departing from the spirit and scope of the invention in its broadest form.

What is claimed is:

1. A system for communicating audio/video data in a packet-based computer network, transmission of data packets through said computer network requiring variable periods of transmission time, the system comprising:

a packet assembly circuit for constructing a data packet from a portion of a stream of digital audio/video data corresponding to an audio/video signal, said packet assembly circuit generating a position identifier indicating a temporal position of said portion relative to said stream, inserting said position identifier into said data packet and queuing said data packet for transmission through a backbone of said computer network; and a packet disassembly circuit, having a buffer associated therewith, for receiving said data packet from said backbone, said packet disassembly circuit inserting said portion into an absolute location of said buffer, said position identifier determining said location, said portion synchronized with adjacent portions of said stream of digital audio/video data in said buffer to compensate for said variable periods of transmission time.

2. The system as recited in claim 1 further comprising an interpolation circuit for inserting synthesized audio/video data into a designated location of said buffer to lengthen said portions of said stream of audio/video data in said buffer.

3. The system as recited in claim 1 further comprising a decimation circuit for deleting audio/video data from a designated location of said buffer to shorten said portions of said stream of audio/video data in said buffer.

4. The system as recited in claim 1 wherein said data packet comprises source and destination fields for determining a transmission route of said data packet through said computer network.

5. The system as recited in claim 1 wherein a value of said position identifier is a function of a length of a portion of said stream of digital audio/video data in a previously transmitted data packet.

6. The system as recited in claim 1 wherein a window of said buffer is about 15 to 25 milliseconds.

7. The system as recited in claim 1 wherein said data packet is capable of containing a portion having a length of about 3 to 10 milliseconds.

8. The system as recited in claim 1 further comprising a digital conversion/compression circuit, coupled to said packet assembly circuit, for digitizing and compressing said audio/video signal into said stream of digital audio/video data.

9. The system as recited in claim 1 further comprising a decompression/analog conversion circuit, coupled to said packet disassembly circuit, for decompressing and converting said stream of digital audio/video data back into said audio/video signal.

10. The system as recited in claim 1 wherein said computer network comprises a plurality of computers coupled to said backbone, said packet assembly circuit and said packet disassembly circuit located in separate ones of said computers.

11. A method of communicating audio/video data in a packet-based computer network, transmission of data packets through said computer network requiring variable periods of transmission time, the method comprising the steps of:

constructing a data packet from a portion of a stream of digital audio/video data corresponding to an audio/video signal with a packet assembly circuit, said packet assembly circuit generating a position identifier indicating a temporal position of said portion relative to said stream, inserting said position identifier into said data packet and queuing said data packet for transmission through a backbone of said computer network; and receiving said data packet from said backbone into a packet disassembly circuit having a buffer associated therewith, said packet disassembly circuit inserting said portion into an absolute location of said buffer, said position identifier determining said location, said portion synchronized with adjacent portions of said stream of digital audio/video data in said buffer to compensate for said variable periods of transmission time.

12. The method as recited in claim 11 further comprising the step of inserting synthesized audio/video data into a designated location of said buffer to lengthen said portions of said stream of audio/video data in said buffer.

13. The method as recited in claim 11 further comprising the step of deleting audio/video data from a designated location of said buffer to shorten said portions of said stream of audio/video data in said buffer.

14. The method as recited in claim 11 further comprising the step of determining a transmission route of said data packet through said computer network with source and destination fields in said data packet.

15. The method as recited in claim 11 further comprising the step of assigning a value of said position identifier as a function of a length of a portion of said stream of digital audio/video data in a previously-transmitted data packet.

16. The method as recited in claim 11 further comprising the step of establishing a window of said buffer at about 15 to 25 milliseconds.

17. The method as recited in claim 11 further comprising the step of containing a portion having a length of about 3 to 10 milliseconds in said data packet.

18. The method as recited in claim 11 further comprising the step of digitizing and compressing said audio/video signal into said stream of digital audio/video data with a digital conversion/compression circuit coupled to said packet assembly circuit.

19. The method as recited in claim 11 further comprising the step of decompressing and converting said stream of digital audio/video data back into said audio/video signal with a decompression/analog conversion circuit coupled to said packet disassembly circuit.

20. A packet-based computer network, comprising:

a backbone coupling, and for communicating packeted data between, first and second computer nodes, serial transmission of data packets through said computer network requiring variable periods of transmission time;

means, coupled to said first node, for receiving an original audio/video signal and generating therefrom a corresponding stream of digital audio/video data; a packet assembly circuit, associated with said first computer node, for constructing data packets from portions of said stream of digital audio/video data, each of said data packets including:

one of said portions, and a position identifier indicating a temporal position of said one of said portions relative to said stream, said packet assembly circuit queuing said data packet for serial transmission to said second node through said backbone;

a packet disassembly circuit, associated with said second computer node and a buffer, for serially receiving said data packets from said backbone, said packet disassembly circuit disassembling each of said data packets by:

inserting said portion into an absolute location of said buffer, said position identifier determining said location, said portion synchronized with adjacent portions of said stream of digital audio/video data in said buffer to compensate for said variable periods of transmission time; and means, coupled to said second node, for generating a reconstructed audio/video signal from said stream of digital audio/video data in said buffer.

* * * * *